United States Patent
Sugiyama et al.

(10) Patent No.: US 10,163,435 B2
(45) Date of Patent: Dec. 25, 2018

(54) VOICE OUTPUT CONTROL DEVICE, VOICE OUTPUT CONTROL METHOD, AND RECORDING MEDIUM

(71) Applicant: DENSO CORPORATION, Kariya, Aichi-pref. (JP)

(72) Inventors: Hitoshi Sugiyama, Kariya (JP); Shigeo Kato, Kariya (JP); Yuuichi Hayashi, Kariya (JP); Yoshihiro Ueda, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/917,439

(22) PCT Filed: Aug. 18, 2014

(86) PCT No.: PCT/JP2014/071582
§ 371 (c)(1),
(2) Date: Mar. 8, 2016

(87) PCT Pub. No.: WO2015/037396
PCT Pub. Date: Mar. 19, 2015

(65) Prior Publication Data
US 2016/0225367 A1    Aug. 4, 2016

(30) Foreign Application Priority Data
Sep. 11, 2013   (JP) .................. 2013-188383

(51) Int. Cl.
*G10L 15/22* (2006.01)
*G01C 21/00* (2006.01)
(Continued)

(52) U.S. Cl.
CPC ........ *G10L 13/043* (2013.01); *G01C 21/3629* (2013.01); *G01C 21/3661* (2013.01);
(Continued)

(58) Field of Classification Search
CPC ......... G10L 15/22; G06F 3/167; G01C 21/00; G01C 21/34
(Continued)

(56) References Cited

U.S. PATENT DOCUMENTS 4,359,713 A * 11/1982 Tsunoda .................. G07C 5/00
340/521
2005/0143915 A1* 6/2005 Odagawa ........... G01C 21/3629
701/443

(Continued)

FOREIGN PATENT DOCUMENTS

EP   2669236 A1   12/2013
JP   H10104001 A   4/1998
(Continued)

OTHER PUBLICATIONS

International Search Report and Written Opinion (in Japanese with English Translation) for PCT/JP2014/071582, dated Oct. 28, 2014; ISA/JP.

*Primary Examiner* — Seong Ah A Shin
(74) *Attorney, Agent, or Firm* — Harness, Dickey & Pierce, P.L.C.

(57) ABSTRACT

A voice output control device includes a control unit. The control unit controls a voice output device to output voice information items according to output requests transmitted from multiple output request units. The control unit compares a high and low relationship of information values preliminary set in the voice information items corresponding to the output requests, and controls the voice output device to output preferentially the voice information item having a higher information value. The control unit determines whether a display device outputs a content corresponding to each voice information item. The control unit sets each information value variably according to a determination result.

13 Claims, 12 Drawing Sheets

(51) Int. Cl.
*G01C 21/34* (2006.01)
*G10L 13/04* (2013.01)
*G06F 3/16* (2006.01)
*G01C 21/36* (2006.01)
*H04R 27/00* (2006.01)
*H04R 3/00* (2006.01)

(52) U.S. Cl.
CPC .............. *G06F 3/162* (2013.01); *G06F 3/167* (2013.01); *H04R 27/00* (2013.01); *H04R 3/00* (2013.01); *H04R 2499/13* (2013.01)

(58) Field of Classification Search
USPC ......... 704/246, 275; 348/705, 738; 701/443; 340/540
See application file for complete search history.

(56) References Cited

U.S. PATENT DOCUMENTS

| | | | | |
|---|---|---|---|---|
| 2007/0050190 | A1* | 3/2007 | Washio | G10L 15/22 704/249 |
| 2007/0101290 | A1* | 5/2007 | Nakashima | G01C 21/265 715/797 |
| 2008/0120106 | A1* | 5/2008 | Izumida | G10L 13/047 704/251 |
| 2011/0095905 | A1* | 4/2011 | Mase | G01C 21/32 340/901 |
| 2011/0169632 | A1* | 7/2011 | Walker | G01C 21/3629 340/539.13 |
| 2012/0215404 | A1 | 8/2012 | Sugiyama et al. | |
| 2013/0031287 | A1 | 1/2013 | Miyake | |
| 2013/0093958 | A1* | 4/2013 | Yoshikawa | G01C 21/3661 348/705 |
| 2013/0215332 | A1* | 8/2013 | Matsumoto | H04N 21/41422 348/738 |
| 2013/0218567 | A1* | 8/2013 | Jones | G10L 13/00 704/260 |
| 2015/0331664 | A1* | 11/2015 | Osawa | G01C 21/3608 704/275 |
| 2015/0363155 | A1 | 12/2015 | Hayashi et al. | |
| 2016/0018235 | A1* | 1/2016 | Azose | G01C 21/3626 701/428 |

FOREIGN PATENT DOCUMENTS

| | | |
|---|---|---|
| JP | H10104003 A | 4/1998 |
| JP | H10104009 A | 4/1998 |
| JP | 2001153672 A | 6/2001 |
| JP | 2008201217 A | 9/2008 |
| JP | 2012190440 A | 10/2012 |
| JP | 2013029977 A | 2/2013 |
| JP | 2013083607 A | 5/2013 |
| JP | 2013160778 A | 8/2013 |
| JP | 2014137790 A | 7/2014 |
| WO | WO-2012101768 A1 | 8/2012 |

* cited by examiner

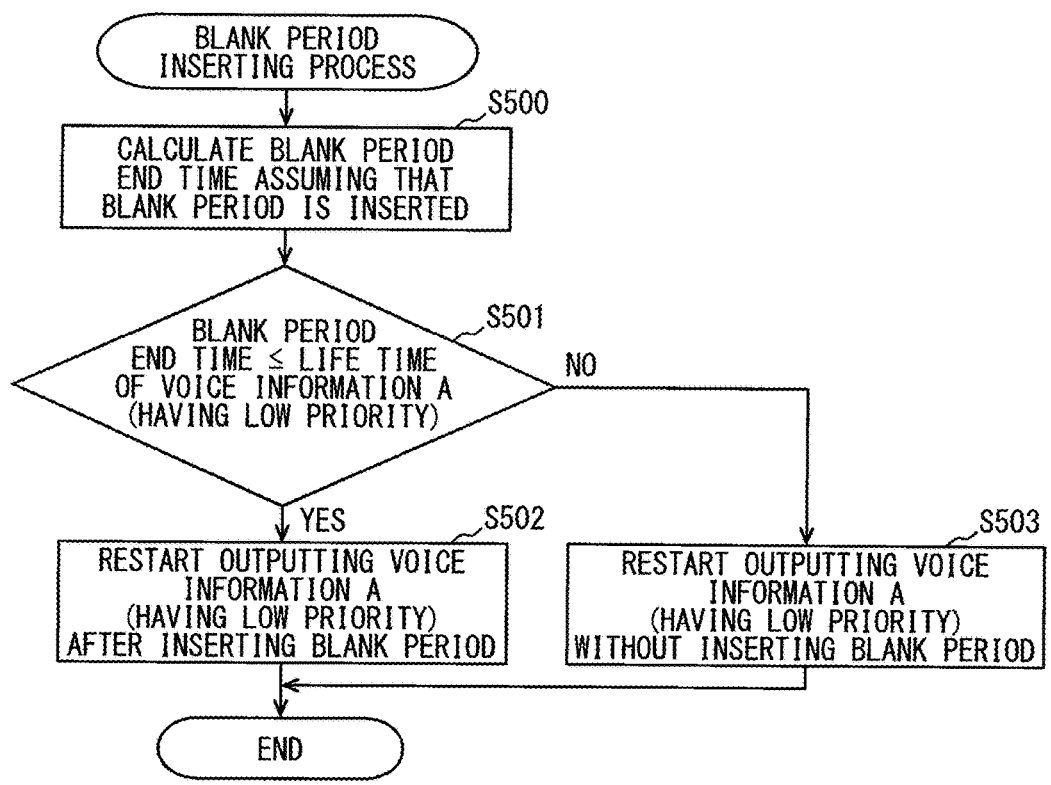

VOICE OUTPUT CONTROL DEVICE, VOICE OUTPUT CONTROL METHOD, AND RECORDING MEDIUM

CROSS REFERENCE TO RELATED APPLICATIONS

This application is a U.S. National Phase Application under 35 U.S.C. 371 of International Application No. PCT/JP2014/071582 filed on Aug. 18, 2014 and published in Japanese as WO 2015/037396 A1 on Mar. 19, 2015. This application is based on and claims the benefit of priority from Japanese Patent Application No. 2013-188383 filed in the Japanese Patent Office on Sep. 11, 2013. The entire disclosures of all of the above applications are incorporated herein by reference.

BACKGROUND

Technical Field

The present disclosure relates to a voice output control device for adjusting a voice output when multiple voice information items exist simultaneously.

Background Art

A voice output interface mounted on a vehicle or the like selects an output object by adjusting a voice output when multiple voice information items are output candidates simultaneously. For example, in a prior art described in Patent Literature No. 1, the voice output is adjusted by a following method.

An adjustment table defining a priority of the voice output as an adjustment object is prepared. The adjustment table is preliminary installed in software of a navigation device. When multiple voice information items exist in the navigation device simultaneously, a higher priority voice information item is output preferentially according to the priority order in the adjustment table.

The Patent Literature No. 1 suggests that, in order to prevent from providing same type information repeatedly to a driver, data may be displayed on a display device when the same content data is input twice, and data may be deleted when the same content data is input three times or more.
Patent Literature 1: JP-H10-104003 A

SUMMARY

Object to be Solved

In the prior art described in the Patent Literature No. 1, one process among voice outputting, displaying or data deleting is selected and executed according to the number of input times without exception when the voice information item has the same content data. Thus, the voice information items having different content data are not adjusted when the voice information items exist simultaneously. Accordingly, in the prior art, the voice information item relatively more important than other voice information items may be deleted without exception and adjustment (for example, when the same content data is input three times or more). As a result, a possibility of opportunities that necessary information is not provided to an user may be increased.

In one aspect of the present invention, it is preferable to adjust the voice output flexibly according to information value of the voice information item.

Means for Achieving Object

According to an aspect of the present disclosure, a voice output control device includes a control unit. The control unit controls a voice output device to output a plurality of voice information items according to a plurality of output requests transmitted from a plurality of output request units for requesting an output of a voice information item. When the plurality of output requests are transmitted to the control unit, the control unit compares a high and low relationship of information values preliminary set in the voice information items corresponding to the output requests, and controls the voice output device to output preferentially the voice information item having a higher information value. The control unit includes: a determination unit and a variable value setting unit.

The determination unit determines whether a display device outputs a content corresponding to each voice information item.

The variable value setting unit sets an information value of a voice information item corresponding to the content variably according to a determination result of the determination unit. Thus, when the plurality of voice information items are output candidates simultaneously, the information values are set variably in view of a presence or absence of a display of the content corresponding to the voice information.

According to an aspect of the present disclosure, the presence or absence of the content display, which is not considered in a prior art, is considered. Thus, the schedule of the output of the voice information item is adjusted in a flexible manner, compared with a case where the voice output is cancelled with no exception in accordance with the number of inputs. Accordingly, the adjustment of the voice output according to the information value of the voice information item is flexibly performed.

According to an another aspect of the present disclosure, a voice output control method includes: controlling a voice output device to output a plurality of voice information items according to a plurality of output requests transmitted from a plurality of output request units for requesting an output of a voice information item. The controlling of the voice output device includes: comparing a high and low relationship of information values preliminary set in the voice information items corresponding to the output requests; controlling the voice output device to output preferentially the voice information item having a higher information value; determining whether a display device outputs a content corresponding to each voice information item; and setting each information value variably according to a determination result of the determining.

Thus, when the plurality of voice information items are output candidates simultaneously, the information values are set variably in view of a presence or absence of a display of the content corresponding to the voice information.

According to the another aspect of the present disclosure, the presence or absence of the content display, which is not considered in a prior art, is considered. Thus, the schedule of the output of the voice information item is adjusted in a flexible manner, compared with a case where the voice output is cancelled with no exception in accordance with the number of inputs. Accordingly, the adjustment of the voice output according to the information value of the voice information item is flexibly performed.

According to a further another aspect of the present disclosure, a computer readable storage medium storing a program for functioning a computer as: a control unit that controls a voice output device to output a plurality of voice information items according to a plurality of output requests transmitted from a plurality of output request units for requesting an output of a voice information item, compares a high and low relationship of information values preliminary set in the voice information items corresponding to the output requests, and controls the voice output device to output preferentially the voice information item having a higher information value; a determination unit that determines whether a display device outputs a content corresponding to each voice information item; and a variable value setting unit that sets each information value variably according to a determination result of the determination unit.

Thus, when the plurality of voice information items are output candidates simultaneously, the information values are set variably in view of a presence or absence of a display of the content corresponding to the voice information.

According to the further another aspect of the present disclosure, the presence or absence of the content display, which is not considered in a prior art, is considered. Thus, the schedule of the output of the voice information item is adjusted in a flexible manner, compared with a case where the voice output is cancelled with no exception in accordance with the number of inputs. Accordingly, the adjustment of the voice output according to the information value of the voice information item is flexibly performed.

BRIEF DESCRIPTION OF DRAWINGS

FIG. 12 is a flowchart showing an example of a blank period inserting process executed the control unit.

DESCRIPTION OF REFERENCE NUMBERS

Figure 1:
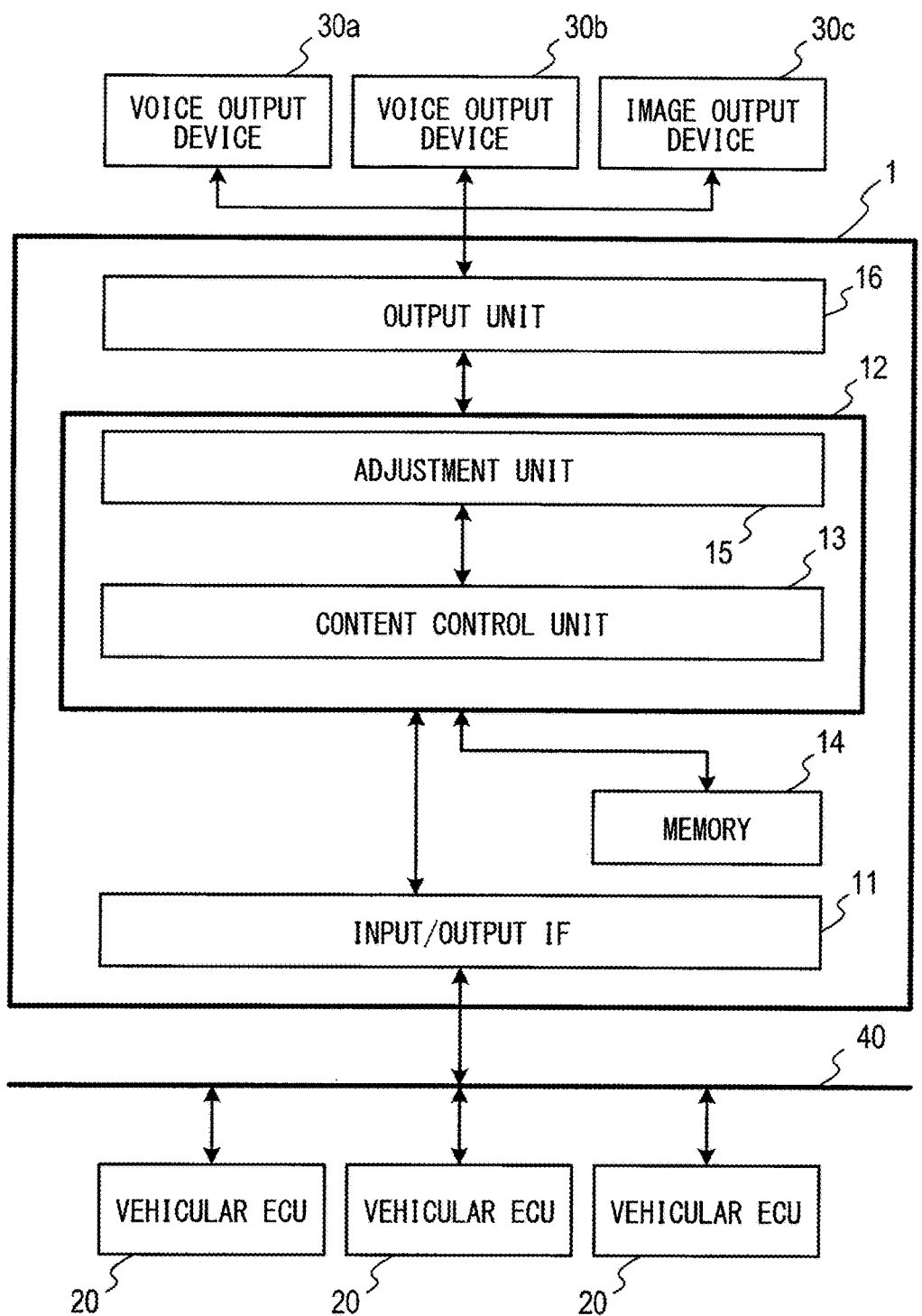
FIG. 1 is a block diagram showing an example of a whole construction of an output control device.

Reference number 1 represents an output control device, reference number 11 represents an input and output interface, reference number 12 represents a control unit, reference number 13 represents a content management unit, reference number 14 represents a memory, reference number 15 represents an adjustment unit, reference number 16 represents an output unit, reference number 20 represents a vehicular ECU, reference numbers 30a and 30b represent a voice output device, reference number 30c represents an image output device, and reference number 40 represents a vehicular network.

EMBODIMENTS FOR CARRYING OUT INVENTION

Embodiments of the present invention will be explained as follows with reference to drawings.

The present invention is not construed to limit to the following embodiments. The embodiments of the present invention include an aspect obtained by omitting a part of the following embodiment. The embodiments of the present invention further include various considerable aspects without departing from the spirit of the invention, which is specified only by the limitations described in claims. The reference numbers used in the following embodiments are appropriately used in claims. However, the reference numbers are used for a purpose to easily understand the invention of each claim, and the reference numbers in claims do not limit the technical aspect of the inventions defined in claims.

Overall Construction

As shown in FIG. 1, an output control device 1 is connected to voice output devices 30a, 30b such as a speaker, an image output device 30c such as a display device, and vehicular devices such as multiple vehicular ECUs 20 so that a vehicular voice display and output system is provided. The voice output devices 30a, 30b are arranged at various positions in a vehicular compartment. The image output device 30c is arranged at a position in the vehicle compartment, at which a driver (i.e., a user) is visible. The output control device 1 is a vehicular apparatus for outputting voice information item and image information item according to an output request in an application program executed by the vehicular ECU 20.

The vehicular ECUs 20 are multiple electronic control units for executing application programs to achieve various functions for a vehicle. In the present embodiment, the functions provided by the application programs of the vehicular ECUs 20 are, for example, a route guidance function with a voice and an image in association with a navigation, a fare guidance function with a voice and an image in association with a ETC electronic toll collection system (i.e., electronic toll collection system, which is a trademark), a driving support guidance function with a voice and an image in association with a vehicle periphery monitoring system, various information service function for weather information, road information and the like with a voice and an image.

In the application programs executed by the vehicular ECUs 20, when an information output event (i.e., a voice output event and an image output event) for outputting the voice information item and the image information item occurs, an information output request (i.e., a voice output request and an image output request) for requesting to output the information item relating to the occurred information output event is notified to the output control device 1. The output control device 1 executes a scheduling and an adjustment of the voice output and the image output according to the information output request notified from the application program, and outputs the information item relating to the information output event through the output devices 30a-30c.

The output control device 1 is an information processing device mainly provided by a CPU, a memory and the like. The output control device 1 includes an input and output interface 11, a control unit 12, a memory 14 and an output unit 16 as a functional element. The input and output interface 11 is an interface for communication to send information to and receive information from the vehicular ECUs 20 through a vehicular network 40. The information transmitted from the vehicular ECU 20 to the output control device 1 is input into the control unit 12 through the input and output interface 11. The memory 14 stores a program for defining various processes to be executed by the control unit 12 and multiple types of contents such as the above described voice information item and the above described image information item. The memory 14 is provided by a semiconductor memory, which is readable by the control unit 12, for example.

The control unit 12 includes a content management unit 13 and an adjustment unit 15. Alternatively, the control unit 12 may include a CPU. In this case, the control unit 12 functions as the content management unit 13 and the adjustment unit 15 by executing a process defined by a program stored in the memory 14. The content management unit 13 obtains the following content information item corresponding to the information output request output from the application program when the adjustment of the voice outputs and the image outputs with respect to multiple information output requests is executed. Then, the content management unit 13 supplies the obtained content information item to the adjustment unit 15.

Figure 2:
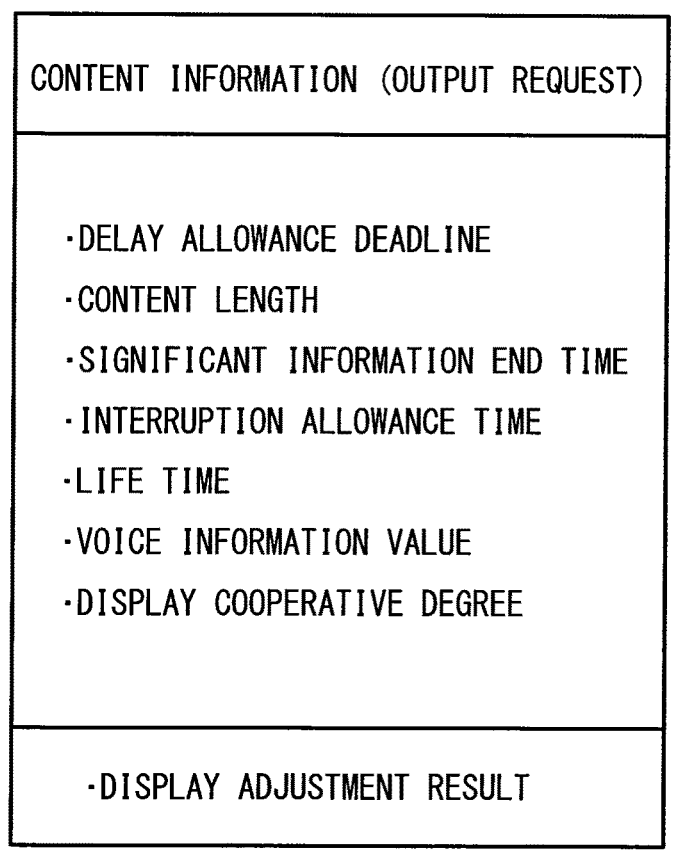
FIG. 2 is a diagram explaining an example of a construction of content information item.

Here, the content information item preliminary set in each content will be explained by describing the voice information item as an example. In the present embodiment, the content information item is defined as additional information item relating to the information output request (e.g., "voice output request") output from the application program, as shown in FIG. 2. The adjustment unit 15 adjusts the voice output based on the content information item relating to the voice output request. The information in the content information item other than later described display adjustment result may be preliminary stored in the memory 14. In the present embodiment, the information is input from the vehicular ECU 20 (which executes the application program) in such a manner that the information is included in the voice output request. Further, the later described display adjustment result in the content information item is determined as the adjustment result of the image output by the adjustment unit 15 when the image information item (i.e., "a display content") relating to or attached to the voice information item exists.

The content information item includes information such as a delay allowance deadline, a content length, a significant information end time, an interruption allowance time, a life time, a voice information value, a display cooperative degree and a display adjustment result, as shown in FIG. 2.

The delay allowance deadline is information in the application program indicative of permissible time of delay from when the voice output event occurs till the output of the voice information item is executed, for example. The delay allowance deadline is set to be shorter when the voice information item has a high emergency priority so that it is necessary to provide the information to the user as soon as possible. The delay allowance deadline is set to be longer when the voice information item has a low emergency priority.

The content length is information indicative of the time interval for outputting the voice information item to the last. The significant information end time shows the time, at which the content of the voice information item is substantially completed to be provided to the user. The signification information end time of the voice information item is settable to be shorter than the content length when a word in the end of a sentence does not include a significant content so that the word is deletable. Specifically, when the voice information item represents "Please turn right at the next corner," the significant information end time can be set to the time, at which the voice message of "Please turn right at the next" is completed to be output.

The interruption allowance time is information showing the time, at which the voice information item reaches a breakpoint of a meaning of the sentence such as a breakpoint between phrases. The life time is information in the application program indicative of an expiration time, at which it is necessary to complete providing the voice information item since the voice output event occurs. The life time may be determined to the preliminary set time in the system of the output control device 1. Alternatively, the life time may be assigned by the application program, which outputs the voice output request. For example, when the application program, which outputs the voice output request, does not assign the life time, the life time may be set to the delay allowance deadline plus the content length. Alternatively, the life time may be assigned in the application program, which outputs the voice output request, to a specific time such as the occurrence time of the voice output event plus one hour (so that it is requested to output within one hour). Thus, the life time may be assigned to the specific time.

The voice information value is information defining an information value (i.e., a priority) of the voice information item. For example, the voice information value may be determined as an initial setting value at each type (or each category) of the voice information item. For example, the voice information item may be classified into categories of contents or categories of purposes such as safety notification, fault notification, route guidance, fare guidance, and entertainment information.

The display cooperative degree is information defining a degree of a connection to the display content. Specifically, the display cooperative degree indicates in binary code whether the voice information item is provided to the user together with the display content, or whether it is enough to provide only one of the voice information item and the display content to the user. When the display cooperative degree indicates the former, the display cooperative degree is set to be one. When the display cooperative degree indicates the latter, the display cooperative degree is set to be zero. As described above, the display adjustment result is defined by the adjustment unit 15 as the adjustment result of the image output when the display content corresponding to the voice information item exists. The display adjustment result indicates whether the display content corresponding to the voice information item is output from the image output device 30c. Further, the display adjustment result indicates the dimensions and the display mode of the display region of the display content. An example of the display mode includes a mode for displaying the display content using a letter, a mode for displaying the display content using an icon, and a mode for displaying the display content using both of the letter and the icon.

The memory 14 stores information, which is necessary for the content management unit 13 to obtain the content information item relating to the voice output request, such as a template of the content information item, and the content of the content information item. The content management unit 13 obtains the content information item relating to the voice information item from the application program in a request source of the voice output, based on the information stored in the memory 14. The adjustment unit 15 adjusts the schedule coordination of the voice output in view of the information value of the voice information item and the chronological sense in the content information item. The detailed explanation of the process executed by the adjustment unit 15 will be described later. The output unit 16 is an interface for controlling a corresponding voice output device 30*a*, 30*b* to output the voice output signal based on the voice information item as the adjustment result output from the adjustment unit 15, and for controlling the corresponding image output device 30*c* to output the image output signal based on the image information item (i.e., the display content) output as the adjustment result.

Main Process

Figure 3:
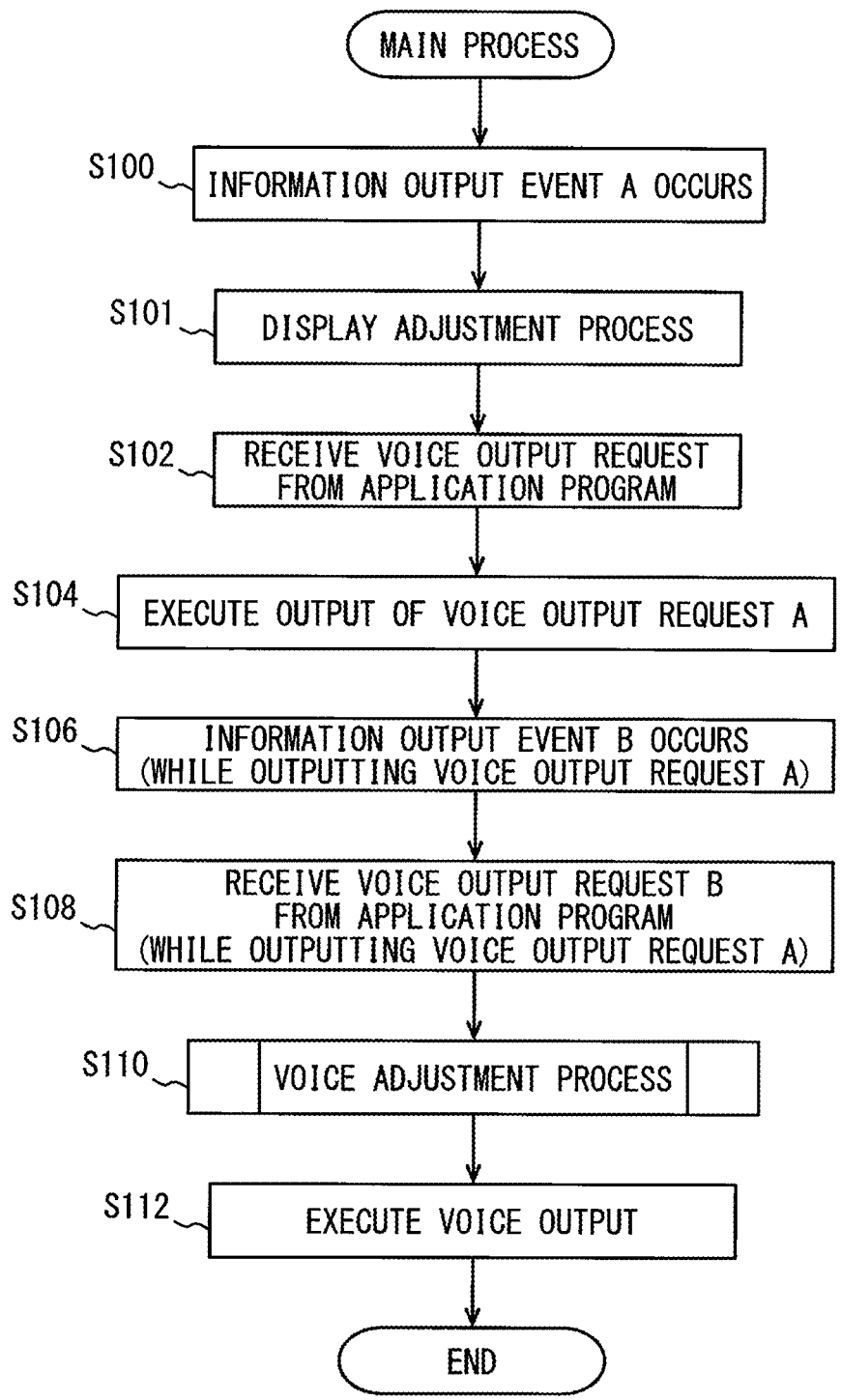
FIG. 3 is a flowchart showing an example of a procedure of a main process executed by a control unit.

A procedure of a main process executed by the control unit 12 in the output control device 1 will be explained with reference to a flowchart in FIG. 3. The main process is executed when an information output event occurs in the application program executed by the vehicular ECU 20.

In the application program executed by one of the vehicular ECUs 20, it is assumed that the information output event A occurs (at step S100). When the information output event A includes an image output event A, and multiple types of the image outputs exist at the same time, the control unit 12 executes a process (i.e., a display adjustment process) relating to the adjustment of the image outputs at step S101. The display adjustment process may be executed similarly to the patent literature (i.e., JP-2012-190440 A), which has been disclosed by the applicant of the present application. Accordingly, the detailed explanation relating to the adjustment process will be skipped.

When the information output event A includes both of the image output event A and the voice output event A, the control unit 12 writes the result of the display adjustment process (i.e., a display adjustment result) into the content information item of the voice information item corresponding to the information output event A. Here, information showing whether the display content corresponding to the voice output event (as the voice information item) is output from the image output device 30*c*, the dimensions of the display region of the display content, and the display mode are written as the display adjustment result.

At step S100, it is assumed that the information output event A including the voice output event A has occurred. In this case, the control unit 12 receives the voice output request, A for outputting the voice information item relating to the voice output event A, from the application program in a request source through the input and output interface 11 (at step S102). At step S104, the control unit 12 starts to output the voice information item relating to the voice output request A through the output unit 16 under a condition that voice information item based on other voice output requests is not output, and voice information item based on other voice output requests is not stored in an output waiting buffer, which will be described later. When the above condition is not satisfied, the control unit 12 executes a voice adjustment process, which will be described later (at step S110).

Here, (at step S106) it is assumed that another voice output event B occurs in the application program executed by the one of the vehicular ECUs 20 while the voice information item relating to the voice output request A is outputting after starting to output the voice information item at step S104. In this case, the control unit 12 receives the voice output request B for outputting the voice information item relating to the voice output event B from the application program in the request source through the input and output interface 11 (at step S108).

At next step S110, the voice adjustment process is executed with respect to the prior voice output request A and the latter voice output request B. The voice adjustment process is executed by the adjustment unit 15 of the control unit 12. The detailed procedure of the voice adjustment process will be described later. At step S112, the control unit 12 executes the voice output based on the result of the voice adjustment process. Here, when there is voice information item stored in the output waiting buffer after the output of the voice information item set as an output candidate is completed, the voice information item is output from the output unit 16. When multiple voice information items are stored in the output waiting buffer, these voice information items are output from the output unit 16 in an order of a schedule, which is adjusted by the adjustment unit 15. After the voice information item is output, the control unit 12 ends the process.

Voice Adjustment Process

Figure 4:
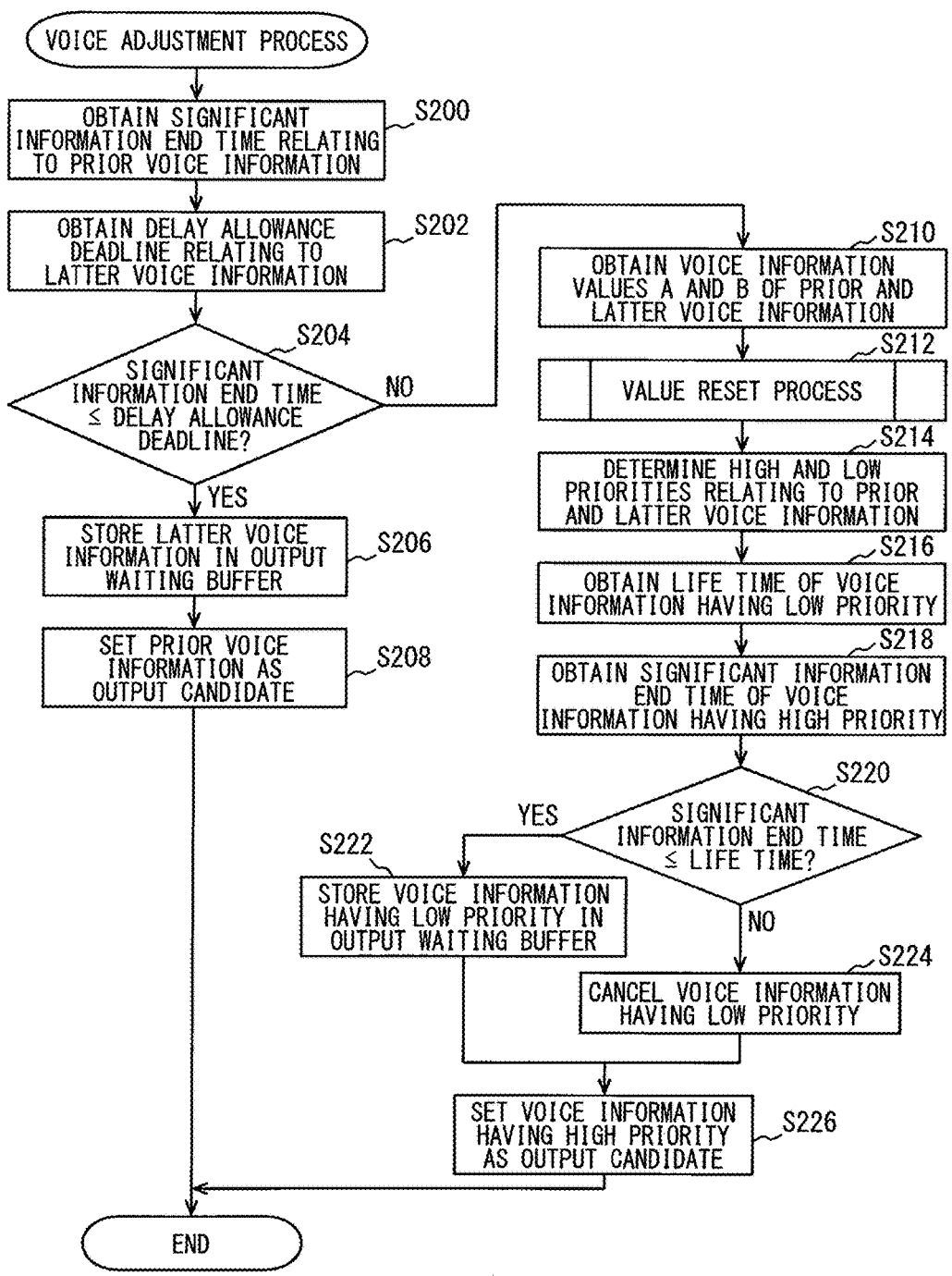
FIG. 4 is a flowchart showing an example of a procedure of a voice adjustment process executed by an adjustment unit.

The procedure of the voice adjustment process executed by the adjustment unit 15 of the control unit 12 will be described with reference to a flowchart in FIG. 4. This process is executed at step S110 in the above described main process (see FIG. 3).

At step S200, the adjustment unit 15 obtains the significant information end time of the prior voice information item according to the content information item relating to the prior voice output request A, which is obtained by the content management unit 13. At step S202, the adjustment unit 15 obtains the delay allowance deadline of the latter voice information item according to the content information item relating to the latter voice output request B, which is obtained by the content management unit 13.

At step S204, the adjustment unit 15 compares the significant information end time of the prior voice information item with the delay allowance deadline of the latter voice information item, so that the adjustment unit 15 branches the process according to an earlier and later relationship of chronological time. For example, when the significant information end time of the prior voice information item indicated by the content information item relating to the voice output request A corresponds to the content length, the significant information end time used in the comparison is the output start time of the prior voice information item plus the content length. At step S204, when the significant information end time of the prior voice information item is prior to the delay allowance deadline of the latter voice information item (i.e., YES at step S204), the adjustment unit 15 proceeds to step S206. On the other hand, when the significant information end time of the prior voice information item is posterior to the delay allowance deadline of the latter voice information item (i.e., NO at step S204), the adjustment unit 15 proceeds to step S210.

At step S206, the adjustment unit 15 stores the output data of the latter voice information item in the output waiting buffer arranged in a predetermined region of the memory. The output waiting buffer is a memory area for temporarily storing the voice information item to be output after the voice information item to be output preferentially. The output waiting buffer is used for holding the output of the voice information item to be output afterward till the output of the voice information item to be output preferentially is completed. At next step S208, the adjustment unit 15 sets the output data of the prior voice information item as the output candidate, and finishes the process.

At step S210, the adjustment unit 15 obtains the voice information value A of the prior voice information item from the content information item relating to the prior voice output request A. Further, the adjustment unit 15 obtains the voice information value B of the latter voice information item from the content information item relating to the latter voice output request B. At next step S212, the control unit 12 executes a process for resetting the voice information value (i.e., "value reset process") with respect to the voice information value A of the prior voice information item and the voice information value B of the latter voice information item. The detailed procedure of the value reset process will be described later.

At step S214, the adjustment unit 15 compares the voice information value A of the prior voice information item and the voice information value B of the latter voice information item based on the result of the value reset process. The adjustment unit 15 determines that the voice information item having a higher information value is defined as "high priority," and the voice information item having a lower information value is defined as "low priority." Here, when the voice information value A of the prior voice information item is equal to the voice information value B of the latter voice information item, the adjustment unit 15 determines that the prior voice information item is defined as "high priority," and the latter voice information item is defined as "low priority." Further, when other voice information item is stored in the output waiting buffer, the other voice information item is set to the prior voice information item, and steps S200 to S214 are executed. Thus, all of the voice information items are prioritized.

At next step S216, the adjustment unit 15 obtains the life time of the voice information item having the low priority from the content information item relating to the voice information item having the low priority. Further, at step S218, the adjustment unit 15 obtains the significant information end time of the voice information item having the high priority from the content information item relating to the voice information item having the high priority.

At step S220, the adjustment unit 15 compares the significant information end time of the voice information item having the high priority with the life time of the voice information item having the low priority. And, the adjustment unit 15 branches the process according to the early-later relationship of the chronological time. Here, when the significant information end time of the voice information item having the high priority is prior to the life time of the voice information item having the low priority (i.e., YES at step S220), the adjustment unit 15 proceeds to step S222. On the other hand, when the significant information end time of the voice information item having the high priority is posterior to the life time of the voice information item having the low priority (i.e., NO at step S220), the adjustment unit 15 proceeds to step S224.

At step S222, the adjustment unit 15 stores the output data of the voice information item having the low priority in the output waiting buffer. At step S224, the adjustment unit 15 cancels the output request of the voice information item having the low priority. At next step S226, the adjustment unit 15 sets the output data of the voice information item having the low priority to be the output candidate, and finishes the process.

Value Reset Process

Figure 5:
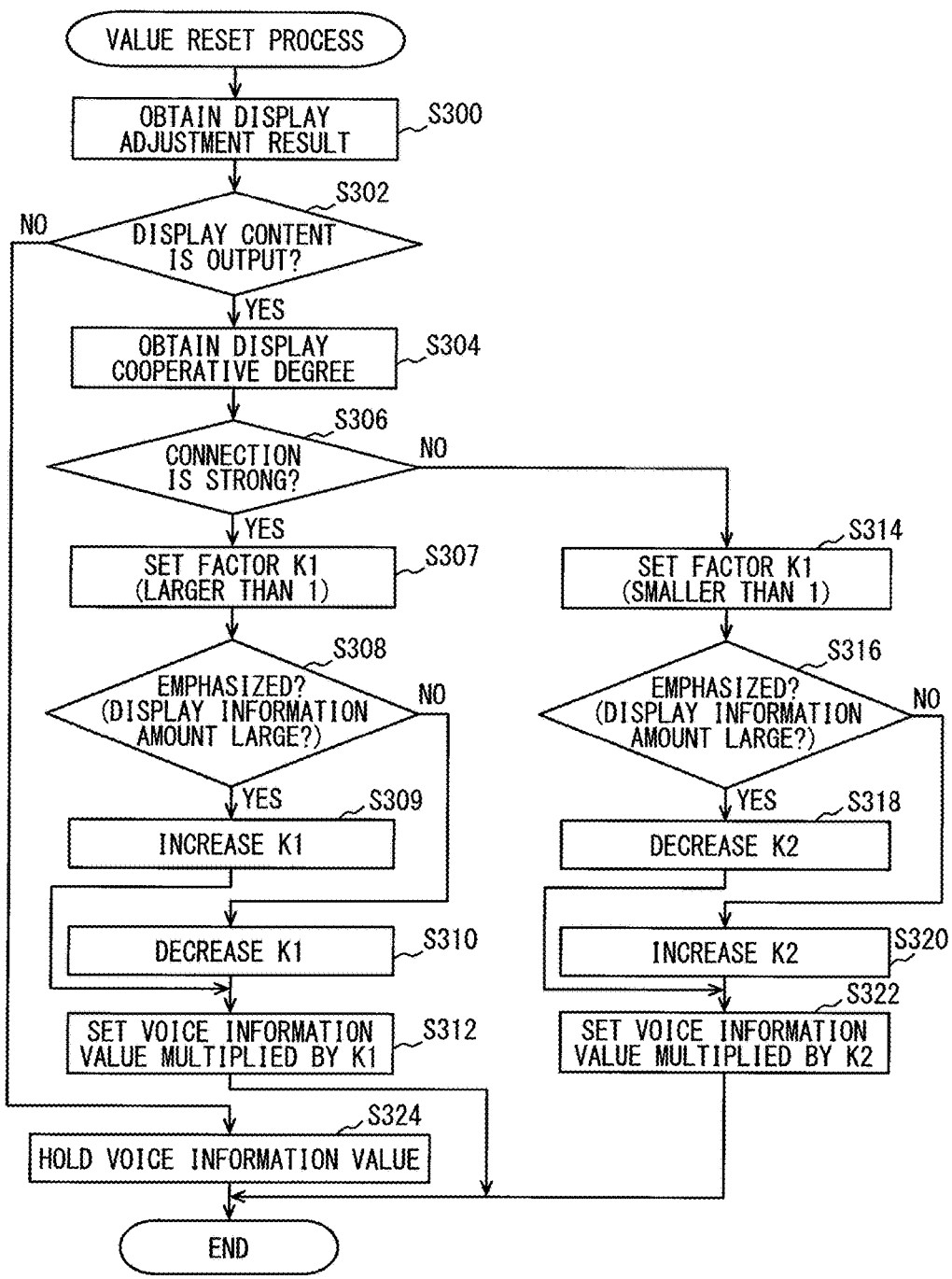
FIG. 5 is a flowchart showing an example of a procedure of a value reset process executed by the adjustment unit.

The procedure of the value reset process executed by the adjustment unit 15 in the control unit 12 will be explained with reference to a flowchart in FIG. 5. This process is executed at step S212 in the above described voice adjustment process (see FIG. 4). The present process is performed with respect to the voice information value A of the prior voice information item and the voice information value B of the latter voice information item.

Figure 6A:
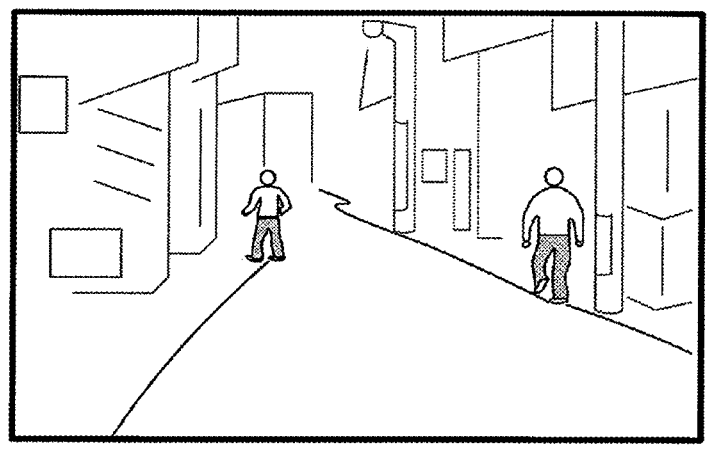
FIG. 6A is a diagram explaining an example of a display screen image when a display content corresponding to the voice information item is not output.

At step S300, the adjustment unit 15 obtains the display adjustment result of the target voice information item from the content information item relating to the voice information item as a target object (i.e., "target voice information item"). At next step S302, the adjustment unit 15 determines whether the display content corresponding to the target voice information item is output from the image output device 30c, according to the obtained display adjustment result. The adjustment unit 15 branches the process according to the determination result. When the display content corresponding to the target voice information item is output from the image output device 30c (i.e., YES at step S302), the adjustment unit 15 proceeds to step S304. As shown in FIG. 6A, when the display content corresponding to the target voice information item is not output from the image output device 30c (i.e., NO at step S302), the adjustment unit 15 proceeds to step S324. Here, FIG. 6A shows an example of an image linked with a vehicle periphery monitoring system. For example, when the existence of the pedestrian is notified to the user using the voice linked with the vehicle periphery monitoring system, it is considered that the image shown in FIG. 6A may be displayed.

At step S304, the adjustment unit 15 obtains the display cooperative degree of the target voice information item from the content information item relating to the target voice information item. At step S306, the adjustment unit 15 branches the process according to the obtained display cooperative degree. Here, when the display cooperative degree of the target voice information item is one (i.e., when the connection between the target voice information item and the display content is strong), the adjustment unit 15 proceeds to step S307. When the display cooperative degree of the target voice information item is zero (i.e., when the connection is weak), the adjustment unit 15 proceeds to step S314.

At step S307, the adjustment unit 15 sets a factor K1 (here, the factor K1 is larger than one) for increasing the information value of the target voice information item. At next step S308, the adjustment unit 15 specifies the display mode of the display content corresponding to the target voice information item based on the display adjustment result obtained at step S300. And, the adjustment unit 15 branches the process according to the display mode. Here, when the display area of the display content corresponding to the target voice information item is larger than a standard area (see Fi. 6B), or when the display mode is an emphasis mode, i.e., when the display information amount is larger than a standard amount (i.e., YES at step S308), the adjustment unit 15 proceeds to step S309. On the other hand, when the display area is small, and when the display mode is not the emphasis mode, i.e., when the display information amount is smaller than the standard amount (i.e., NO at step S308), the adjustment unit 15 proceeds to step S310.

An example of the display mode having a large display information amount or an emphasized display mode includes a display mode for outputting the display content using both of letters and icons. On the other hand, an example of the display mode having a small display information amount or an not-emphasized display mode includes a display mode for outputting the display content using only one of letters and icons.

Thus, at step S308, when the display content is output using both of the letters and the icons, the adjustment unit 15 determines positively. When the display content is output using only one of the letters and the icons, the adjustment unit 15 determines negatively.

In another example at step S308, when the display mode of the display content is a mode for displaying an occurrence of an event and a content of the event, the adjustment unit 15 determines positively. When the display mode of the display content is a mode for displaying the occurrence of the event but not displaying a content of the event, the adjustment unit 15 determines negatively.

At step S309, the adjustment unit 15 increases the factor K1, which is set at step S307, by a predetermined ratio. At step S310, the adjustment unit 15 decreases the factor K1, which is set at step S307, by a predetermined ratio within a range than the decreased factor K1 as a result of decreasing is larger than one. At next step S312, the adjustment unit 15 resets the voice information item value by multiplying the factor K1 and the voice information value of the target voice information item. After the voice information value is reset, the present process is completed.

At step S314, to which the adjustment unit proceed when the target voice information item and the display content have a weak connection, the adjustment unit 15 sets a factor K2 (here, the factor K2 is larger than zero, and smaller than one) for reducing the information value of the target voice information item. At next step S316, the adjustment unit 15 specifies the display mode of the display content corresponding to the target voice information item based on the display adjustment result obtained at step S300. And, the adjustment unit 15 branches the process according to the display mode. Here, when the display mode is an emphasis mode, i.e., when the display information amount is larger than a standard amount (i.e., YES at step S316), the adjustment unit 15 proceeds to step S318. On the other hand, when the display mode is not an emphasis mode, i.e., when the display information amount is smaller than the standard amount (i.e., NO at step S316), the adjustment unit 15 proceeds to step S320.

At step S318, the adjustment unit 15 decreases the factor K2, which is set at step S314, by a predetermined ratio. At step S320, the adjustment unit 15 increases the factor K2, which is set at step S314, by a predetermined ratio within a range that the increased factor K2 as a result of increasing does not exceed one. At next step S322, the adjustment unit 15 resets the voice information value by multiplying the factor K2 and the voice information value of the target voice information item. After the voice information value is reset, the present process is completed.

At step S324, to which the adjustment unit 15 proceeds when the display content corresponding to the target voice information item is not output from the image output device 30c, the adjustment unit 15 holds the voice information value, which is defined as a default value, without multiplying the factor and the voice information value of the target voice information item. Then, the present process is completed.

A Concrete Execution Example No. 1 of the Voice Adjustment Process

A concrete execution example No. 1 of the above described voice adjustment process (in FIG. 4) will be explained with reference to FIG. 7. Here, an example case is assumed that the voice information item A relating to the route guidance and the voice information item B relating to the fee guidance are overlapped. The voice information item A relating to the route guidance includes, for example, a guidance message of "Please turn right at a corner about 300 meters away." The voice information item B relating to the fee guidance includes, for example, a guidance message of "The fee is 3200 Japanese yen."

Figure 7:
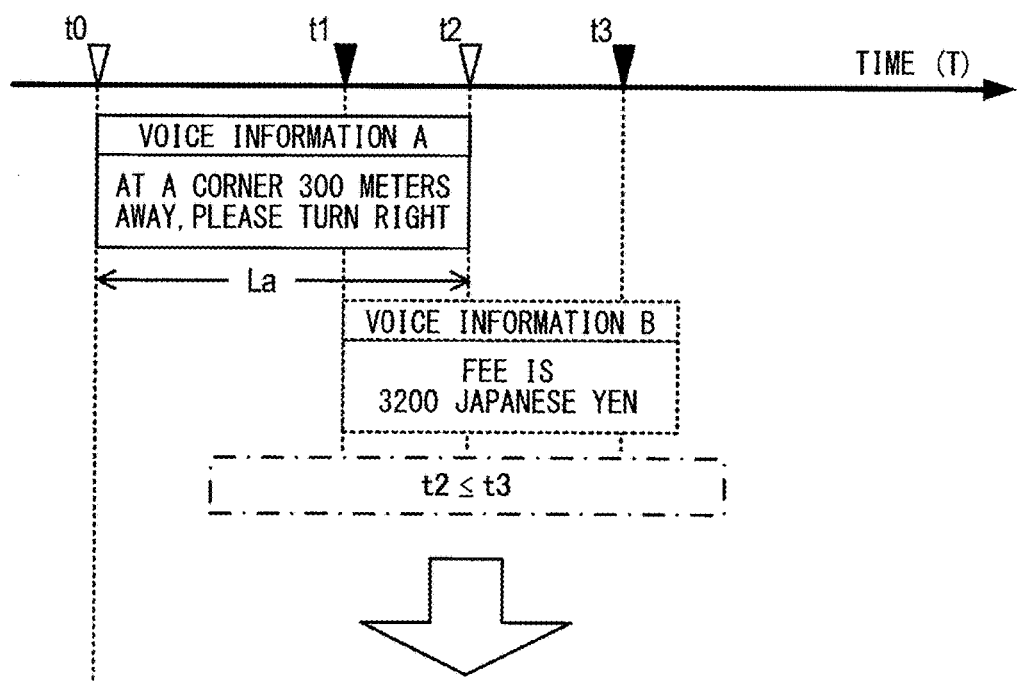
FIG. 7 is a diagram explaining an example of a concrete execution example No. 1 of the voice adjustment process.
Figure 7:
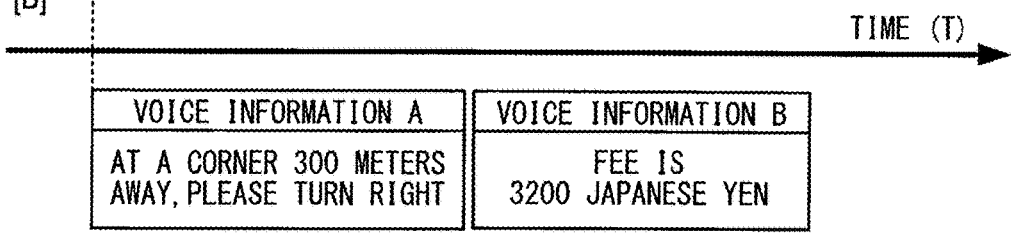

According to an example shown in A part of FIG. 7, the output of the prior voice information item A starts. In this case, the significant information end time indicated in the content information item relating to the voice information item A is defined as t2. For example, when the significant information end time of the voice information item A indicated in the content information item corresponds to the content length La of the voice information item A, the significant information end time t2 defined here corresponds to the output start time t0 of the voice information item A plus the content length La. When the actual voice output of the voice information item A extends from the event occurrence time of the voice output request A relating to the voice information item A to the delay allowance deadline, the significant information end time t2 is equal to the time length plus the content length La, which corresponds to the event occurrence time of the voice output request A plus the delay allowance deadline.

As shown in A part of FIG. 7, the voice output event relating to the voice information item B occurs at the time t1 while outputting the voice information item A. In this case, the delay allowance deadline indicated in the content information item relating to the voice information item B is defined as t3.

In the example shown in A part of FIG. 7, the significant information end time t3 of the latter voice information item B is posterior to the significant information end time t2 of the prior voice information item A. In this case, as shown in B part of FIG. 7, the output of the latter voice information item B temporarily stands ready. After the output of the voice information item A is completed, the output of the voice information item B is executed.

A Concrete Execution Example No. 2 of the Voice Adjustment Process

A concrete execution example No. 2 of the above described voice adjustment process will be explained with reference to FIG. 8. This explanation includes an explanation relating to the value reset process (see FIG. 5). The assumption of the present case is substantially similar to the above described execution example No. 1. Here, in the present example, the display content corresponding to the voice information item A does not exist. Accordingly, the content information item relating to the voice information item A does not include the display adjustment result and the display cooperative degree. On the other hand, in the voice information item B, the corresponding display content exists. Accordingly, the content information item relating to the voice information item B includes the display adjustment result and the display cooperative degree. Further, since the connection between the voice information item B and the corresponding display content is weak, the display cooperative degree is set to be zero.

Figure 8:
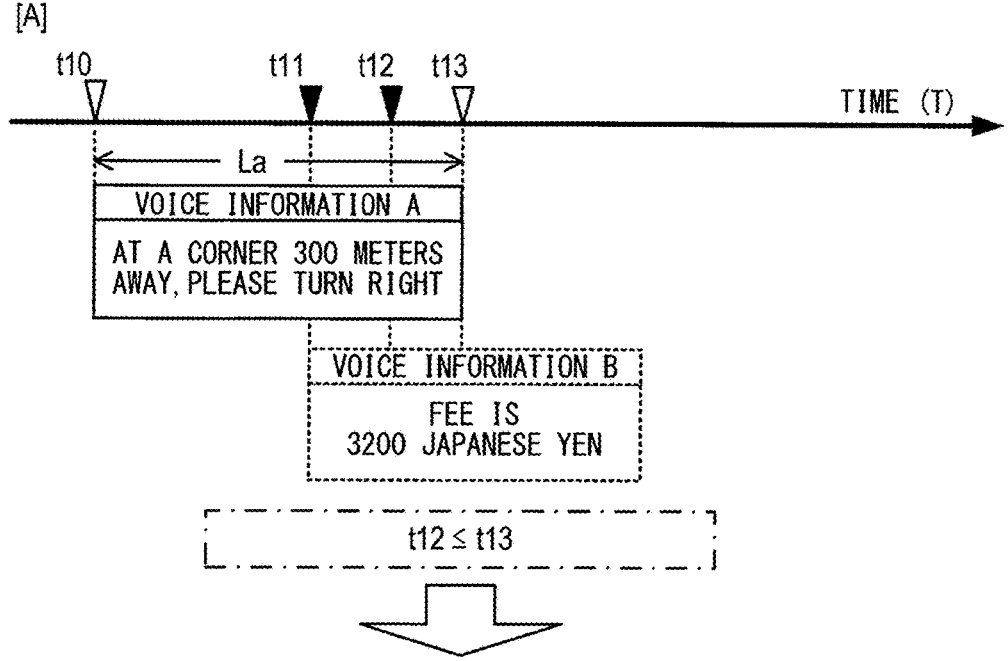
FIG. 8 is a diagram explaining an example of a concrete execution example No. 2 of the voice adjustment process (including an explanation of a value reset process).
Figure 8:
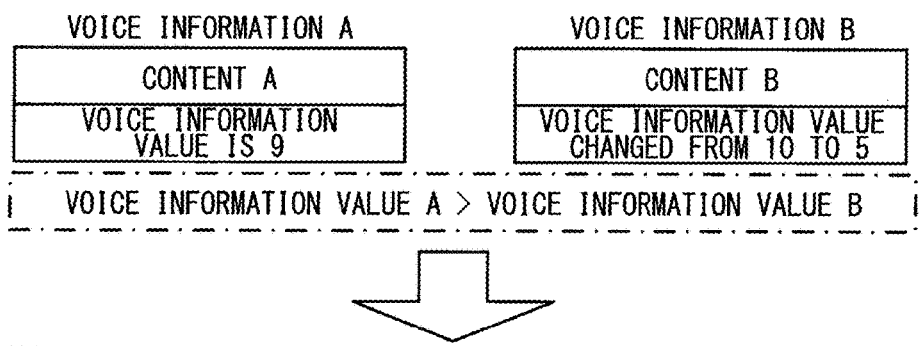
Figure 8:
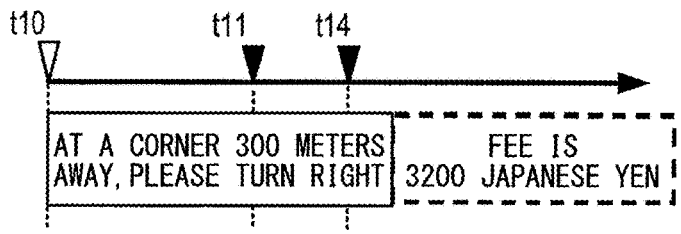

As illustrated by an example in A part of FIG. 8, in the present case, the output of the prior voice information item A starts. In this case, the significant information end time indicated in the content information item relating to the voice information item A is defined as t13. For example, when the significant information end time of the voice information item A indicated in the content information item corresponds to the content length La of the voice information item A, the significant information end time t13 corresponds to the output start time t10 of the voice information item A plus the content length La. On the other hand, it is assumed that the voice output event relating to the voice information item B occurs at time t11 while outputting the voice information item A. In this case, the delay allowance deadline indicated in the content information item relating to the voice information item B is defined as t12.

In the present case, the delay allowance deadline t12 of the latter voice information item B comes earlier than the significant information end time t13 of the prior voice information item A. In this case, as illustrated by an example in B part of FIG. 8, the voice information value indicated in the content information item relating to the voice information item A is compared with the voice information value indicated in the content information item relating to the voice information item B. Here, when comparing with the voice information value preliminary defined as a default value, an example is assumed such that the voice information value of the latter voice information item B (that is 10) is larger than the voice information value of the prior voice information item A (that is 9).

In the present case, as described above, the display content corresponding to the voice information item A does not exist, but the display content corresponding to the voice information item B. Accordingly, the reset of the voice information value with respect to the voice information item B as an object is executed (in the value reset process). As illustrated by an example in B part of FIG. 8, when the connection between the voice information item B and the display content is weak, the factor K2 (for example, 0.5) is multiplied with the voice information value (that is 10) of the voice information item B. Thus, the voice information value (i.e., 5) in cooperation with the display adjustment is newly set as the voice information value of the voice information item B. And, the content information item is rewritten. On the other hand, the voice information value (that is 9) of the voice information item A does not change.

Figure 6B:
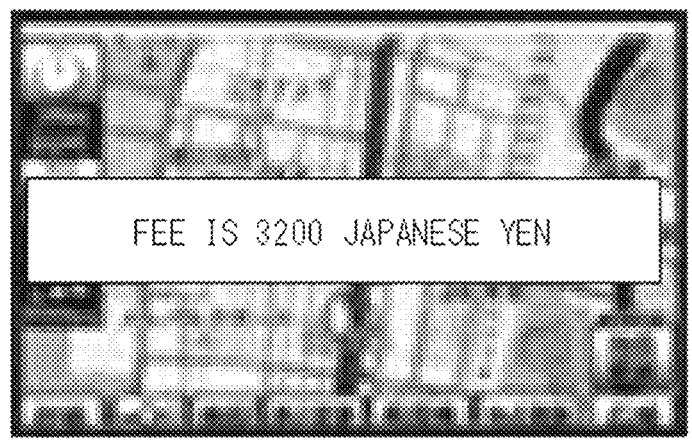
FIG. 6B is a diagram explaining an example of a display screen image when a display content corresponding to the voice information item is output.

Thus, the voice information value (i.e., 9) indicated in the content information item relating to the voice information item A becomes larger than the voice information value (i.e., 5) indicated in the content information item relating to the voice information item B. Accordingly, as a result of the adjustment based on the voice information value, it is determined that the prior voice information item A has "high priority," and the latter voice information item B has "low priority." As illustrated by an example in C part of FIG. 8, when the significant information end time t13 of the voice information item A having the high priority comes later than the life time t14 of the voice information item B having the low priority, the voice information item B is cancelled, and only the output of the voice information item A is executed (or continued). In this case, although the voice information item B is not output as the voice, the display content (see FIG. 6B) corresponding to the voice information item B is output as the image.

In another example, assuming that the display content corresponding to the voice information item B does not exists, the voice information value (that is 10) of the voice information item B does not also change. In this case, as defined in the default values, the voice information value (that is 10) indicated in the content information item relating to the voice information item B is larger than the voice information value (that is 9) indicated in the content information item relating to the voice information item A.

In further another example, assuming that the voice information item includes the corresponding display content, and the connection between the voice information item B and the corresponding display content is strong, the factor K1 (e.g., 1.5) is multiplied with the voice information value (that is 10) of the voice information item B. Thus, the voice information value (i.e., 15) in cooperation with the display adjustment is newly set as the voice information value of the voice information item B. And, the content information item is rewritten. In this case, the voice information value (that is 15) indicated in the content information item relating to the voice information item B becomes larger than the voice information value (that is 9) indicated in the content information item relating to the voice information item A.

Figure 9:
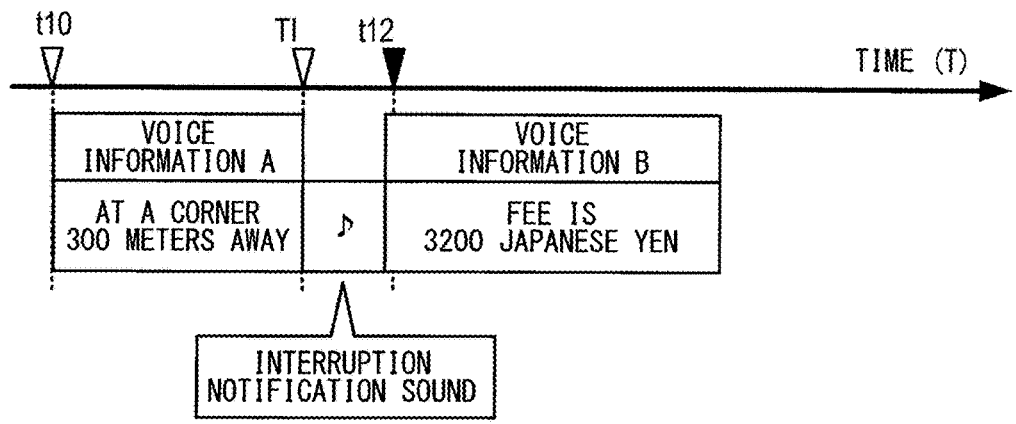
FIG. 9 is a diagram explaining an example of an execution example other than an execution example No. 2 of the voice adjustment process.

In the above examples, as a result of the adjustment based on the voice information values, it is determined that the prior voice information item A has "low priority," and the latter voice information item B has "high priority." Accordingly, as illustrated by an example in FIG. 9, the output of the voice information item A is interrupted, and the voice information item B is interposed and output. The timing when the output of the voice information item A is interrupted may be defined as the interruption allowance time TI indicated in the content information item relating to the voice information item A. Thus, even when the voice information item A is interrupted, uncomfortable feeling of the user is reduced.

In the beginning of the voice output at the interruption, an interruption notification sound may be output just before the voice information item. Thus, the uncomfortable feeling received by the user and caused by the interruption of the voice information item is reduced. For example, the interruption notification sound is output under a condition that a relationship equation of "interruption allowance time TI of voice information item A (having low priority) plus content length LI of interruption notification sound is smaller than delay allowance deadline t12 of voice information item B (having high priority)" is satisfied. The content length LI of the interruption notification sound may be preliminary defined with respect to the system of the output control device 1.

Figure 10:
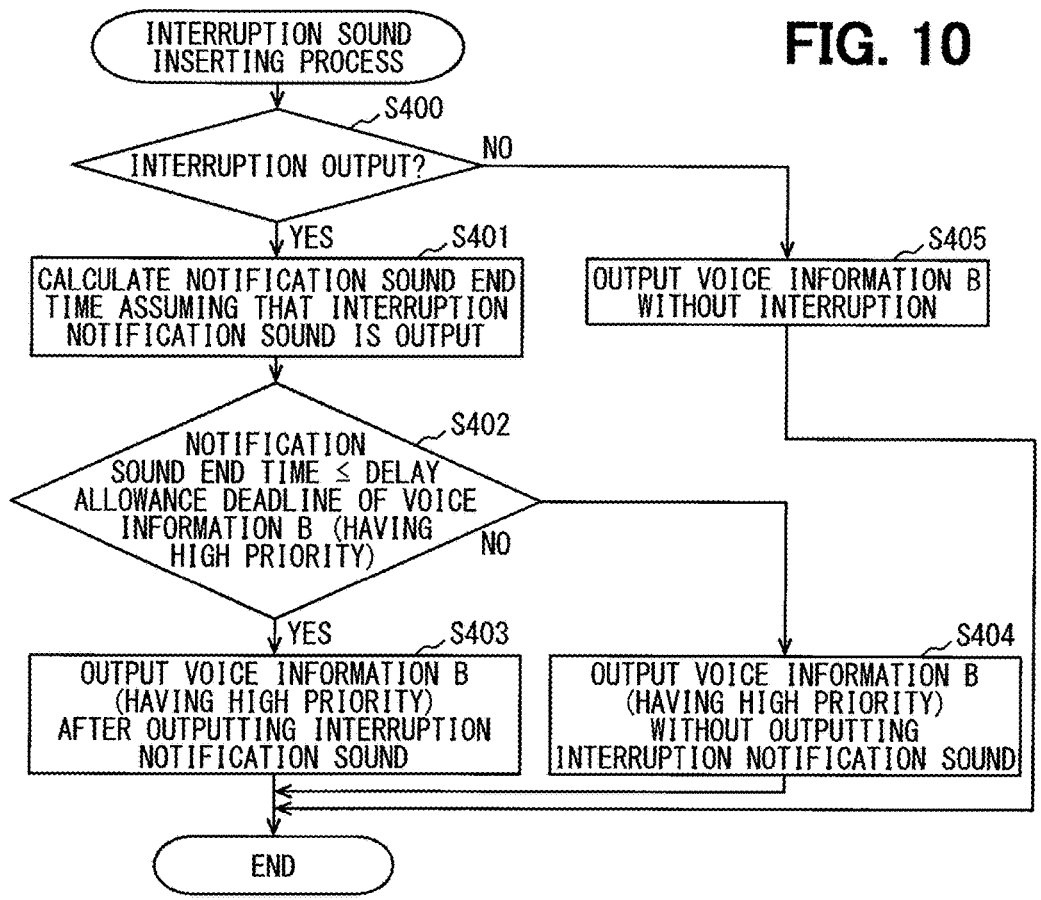
FIG. 10 is a flowchart showing an example of an interruption sound inserting process executed by the control unit.

Here, the detail of a process (i.e., "an interruption sound inserting process") executed at step S112 by the control unit 12 in order to insert the interruption notification sound will be explained with reference to FIG. 10.

The control unit 12 proceeds to step S401 when the control unit 12 interrupts the output of the prior voice information item A corresponding to the voice output request A, and interposes and outputs the latter voice information item B corresponding to the voice output request B, according to the result of the voice adjustment process (i.e., YES at step S400). On the other hand, the control unit 12 proceeds to step S405 when the latter voice information item B is output after the output of the prior voice information item is completed (i.e., NO at step S400).

At step S401, the control unit 12 calculates the notification sound end time TI+LI, which is prepared by adding the content length LI of the interruption notification sound and the interruption allowance time TI of the voice information item A (having the low priority). At next step S402, the control unit 12 determines whether the notification sound end time TI+LI comes earlier than the delay allowance deadline t12 of the voice information item B (having the high priority). When the notification sound end time TI+LI comes earlier than the delay allowance deadline t12 of the voice information item B (having the high priority) (i.e., YES at step S402), the control unit 12 proceeds to step S403. In other cases (i.e., NO at step S402), the control unit 12 proceeds to step S404.

At step S403, the control unit 12 outputs the interruption notification sound after the control unit 12 interrupts the output of the voice information item A at the interruption allowance time TI. After the control unit 12 outputs the interruption notification sound, the control unit 12 outputs the voice information item B. At step S404, the control unit 12 outputs the voice information item B without outputting the interruption notification sound after the control unit 12 interrupts the output of the voice information item A at the interruption allowance time TI. In addition, at step S405, the control unit 12 outputs the voice information item B without outputting the interruption notification sound after the output of the voice information item A is completed. After that, the control unit 12 ends the interruption sound inserting process. The interruption sound inserting process provides to notify the user of the interruption appropriately.

A Concrete Execution Example No. 3 of the Voice Adjustment Process

A concrete execution example No. 3 of the above described voice adjustment process will be explained with reference to FIG. 11. Here, a case is assumed such that tow voice output requests for the voice information item A relating to the weather guidance and the voice information item B relating to the fee guidance are overlapped. The voice information item A relating to the weather guidance includes a guidance message of, for example, "On month X, date Y, today's weather will be reported. It will be fine nationwide." The voice information item B relating to the fee guidance includes, for example, a guidance message of "The fee is 3200 Japanese yen."

Figure 11:
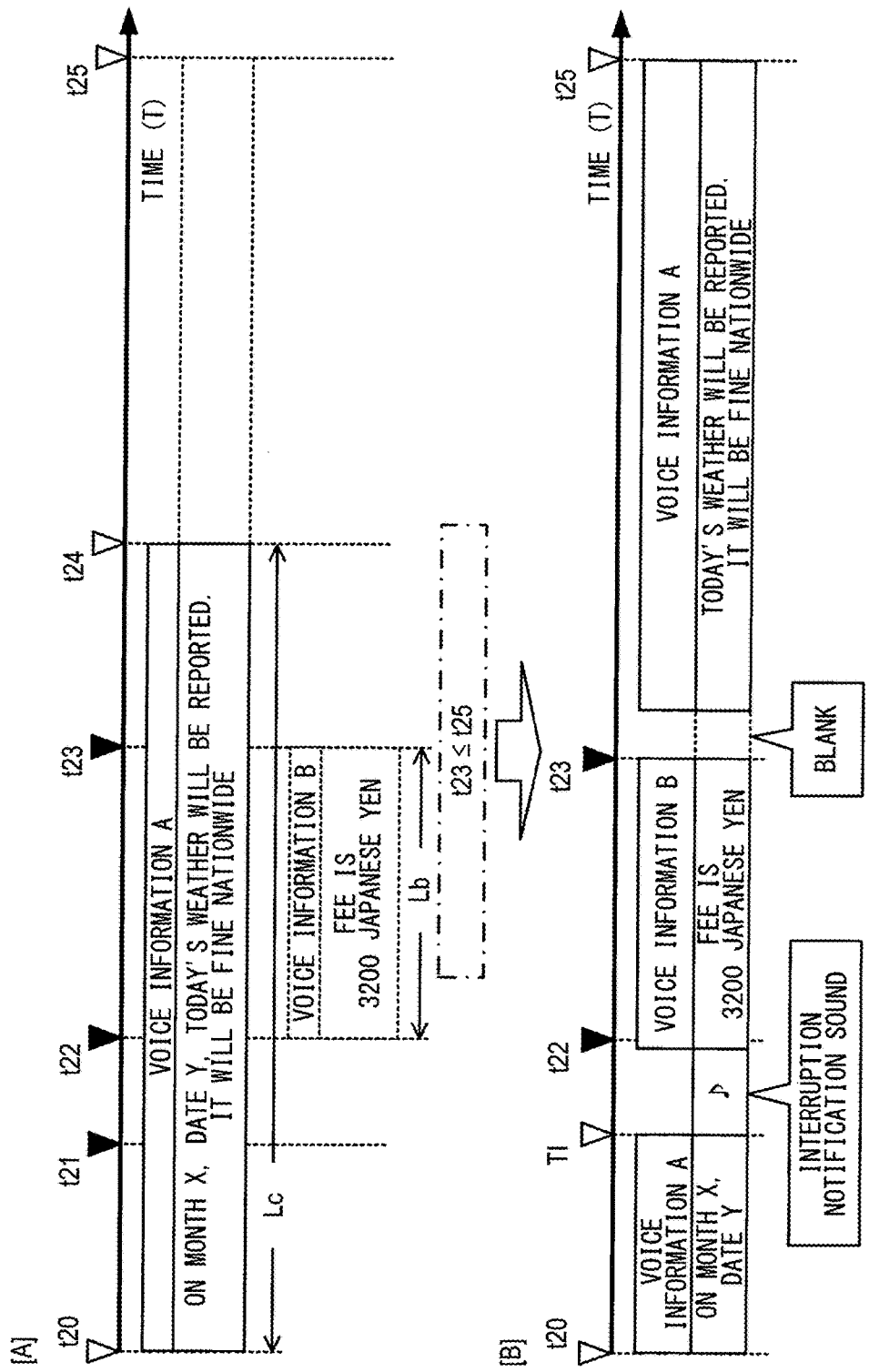
FIG. 11 is a diagram explaining an example of a concrete execution example No. 3 of the voice adjustment process.

According to a case shown in A part of FIG. 11, the output of the prior voice information item A starts. In this case, the significant information end time indicated in the content information item relating to the voice information item A is defined as t24. For example, when the signification information end time of the voice information item A indicated in the content information item corresponds to the content length Lc of the voice information item A, the significant information end time t24 corresponds to the output start time t20 of the voice information item A plus the content length Lc. On the other hand, the vice output event relating to the voice information item B occurs at time t21 while outputting the voice information item A. In this case, the delay allowance deadline indicated in the content information item relating to the voice information item B is defined as t22.

In the case shown in A part of FIG. 11, the delay allowance deadline t22 of the latter voice information item B comes earlier than the signification information end time t24 of the prior voice information item A. In this case, the adjustment is executed with comparing the voice information value indicated in the content information item relating to the voice information item A and the voice information value indicated in the content information item relating to the voice information item B. Here, the explanation will proceed assuming that the voice information value of the voice information item B is larger than the voice information value of the voice information item A.

As a result of the adjustment based on the voice information value, it is determined that the voice information item A has "low priority," and the voice information item B has "high priority." Further, the significant information end time t23 of the voice information item B is compared with the life time t25 indicated in the content information item relating to the voice information item A. Thus, it is determined whether the output of the voice information item A stands ready. Here, the significant information end time t23 of the voice information item B is equal to the delay allowance deadline t22 of the voice information item B plus the content length Lb of the voice information item B. As a result of comparison, the voice information item A is stored in the output waiting buffer under a condition that a relationship equation of "the significant information end time t23 of the voice information item B (having the high priority)<=the life time t25 of the voice information item A (having the low priority)" is satisfied.

As a result of the adjustment, as illustrated by an example in B part of FIG. 11, the output of the voice information item A is interrupted, and the voice information item B is interposed and output. The timing when the output of the voice information item A is interrupted corresponds to the interruption allowance time TI indicated in the content information item relating to the voice information item A. In the beginning of the voice output at the interruption, an interruption notification sound is output just before outputting the voice information item B. After the output of the voice information item B is completed, the output of the voice information item A stored in the output waiting buffer restarts. The output of the voice information item A restarts from continuation of a point at which the voice information item A is interrupted at the interruption allowance time TI.

When the output of the voice information item, which stands ready for the voice output of the interruption, restarts, the blank period with no sound may be inserted just before the output of the voice information item. Thus, the uncomfortable feeling received by the user and caused by the switching of the voice outputs is reduced. For example, the blank period may be inserted under a condition that a relationship equation of "the life time t25 of the voice information item A (having the low priority)>the significant information end time t23 of the voice information item B (having the high priority) plus the content length LN of the blank period" is satisfied. The content length LN of the blank period may be preliminary determined with respect to the system of the output control device 1.

Here, in order to insert the blank period (i.e., silent period), the detail of a process (i.e., a blank period inserting process) executed by the control unit 12 at step S112 will be explained with reference to FIG. 12. The blank period inserting process is executed under a condition that the voice output caused by the interruption starts.

When the blank period inserting process starts, the control unit 12 calculates the blank period end time prepared by adding the significant information end time t23 of the voice information item B (having the high priority), of which the voice output caused by the interruption starts, and the content length LN of the blank period (at step S500). After that, the control unit 12 determines whether the blank period end time comes earlier than the life time t25 of the voice information item A (having the low priority), which is output after the interruption (at step S501). When the blank period end time comes earlier than the life time t25 of the voice information item A (having the low priority) (i.e., YES at step S501), it proceeds to step S502. On the other hand, in other cases (i.e., NO at step S501), it proceeds to step S503.

At step S502, the control unit 12 terminates the voice output of the voice information item B, and switches to the silent mode at the timing corresponding to the significant information end time t23 of the voice information item B. The switching time point is a starting time point of the blank period. After the blank period ends, the output of the voice information item A restarts. At step S503, the control unit 12 terminates the voice output of the voice information item B at the timing corresponding to the significant information end time t23 of the voice information item B, and restarts the output of the voice information item A just after the termination. After that, the control unit 12 terminates the blank period inserting process. The blank period inserting process provides to generate the blank period appropriately.

Effects

As described above, the output control device 1 controls the voice output devices 30a, 30b to output the voice information item according to the voice output request transmitted from multiple vehicular ECUs 20 that requests the output of the voice information item. The control unit 12 compares a high and low relationship of the voice information values, which are preliminary set at each voice information item corresponding to a respective voice output request when multiple voice output requests are transmitted. Thus, the control unit 12 outputs the voice information item having higher voice information value from the voice output device preferentially. In this case, the control unit 12 executes the value reset process.

In the value reset process, it is determined whether the display content corresponding to each voice information item is output from the image output device 30c (at steps S300 to S302). According to the determination result, the voice information value of the voice information item corresponding to the display content is variably set (at steps S304 to S324).

When multiple voice information items are output candidates at the same time, the voice information value is variably set in view of the adjustment result of the display content corresponding to each voice information item. Accordingly, the voice information item, which is totally optimized, is preferentially output in view of the information output of the voice output and the image display, compared with a case where the high and low relationship of the voice information values, which are simply set as a default value, are compared with each other.

Further, in the output control device 1, the cooperation of the image display and the voice output with the adjustment, which is not considered conventionally, is created, so that the schedule of the output of the voice information item is adjusted in a flexible manner, compared with a case where the voice output is cancelled with no exception in accordance with the number of inputs. Thus, the voice information values of the voice information items are optimized, so that the adjustment of the voice output is flexibly performed.

In the value reset process, when the display content is output from the image output device 30c, and the connection with the display content is weak, the voice information value of the voice information item corresponding to the display content is reduced. Thus, a large amount of the information output is easily performed by one of the voice output and the image display. Thus, a large amount of information is effectively provided to the user.

Further, in the value reset process, when the display content is output from the image output device 30c, and the connection with the display content is strong, the voice information value of the voice information item corresponding to the display content is increased. Thus, the voice output is easily performed as long as the image display of the information is executed. Thus, opportunities for providing the information to the user with an emphasis are increased as long as the information is important.

The important information is, for example, most urgent information or information affecting the safety. In the above embodiment, the strong and weak relationship of the "connection" is preliminary defined based on the information of the display cooperative degree. Thus, in the value reset process, the voice information value is increased and decreased based on the predetermined information (i.e., the display cooperative degree) indicative of the strong and weak relationship of the "connection."

Further, in the value reset process, when the display content is output from the image output device 30c, the voice information value of the voice information item corresponding to the display content is variably set in accordance with the display mode of the display content in the image output device 30c.

In a case where the connection between the voice information item and the corresponding display content is weak, the reduction amount of the voice information value of the voice information item becomes small when the display information amount of the corresponding display content is small, and the reduction amount of the voice information value becomes large when the display information amount of the corresponding display content is large. Thus, the information amount provided to the user becomes constant easily with respect to multiple voice information items, which are output candidates simultaneously. Accordingly, many information items are provided to the user appropriately.

In a case where the connection between the voice information item and the corresponding display content is strong, the increase amount of the voice information value of the voice information item becomes small when the display information amount of the corresponding display content is small, and the increase amount of the voice information value becomes large when the display information amount of the corresponding display content is large. Thus, when the display information amount of the display content is large, the voice output is easily performed. Accordingly, opportunities for providing the information to the user with an emphasis at a maximum are increased as long as the information is important.

OTHER EMBODIMENTS

Thus, the embodiments of the present invention are described. The present invention is not limited to the above embodiments. The present invention is executable in various embodiments within the aspect of the present invention.

In the value reset process of the above embodiments, when the display content is output from the image output device 30c, the voice information value of the voice information item corresponding to the display content is variably set in accordance with the display mode of the display content in the image output device 30c. However, the detail of the value reset process is not limited to this.

For example, in the value reset process, when the display content is not output from the image output device 30c, the voice information value of the voice information item corresponding to the display content may be reduced or increased in accordance with the display mode of the display content output by the image output device 30c at that time. Here, when the voice information value is increased, the information values of other voice information items for performing the image display are reduced relatively. Thus, according to reasons already described, many information items are provided to the user effectively. Further, when the voice information value is reduced, the information values of other voice information items for performing the image display are increased relatively. Thus, according to reasons already described, opportunities for providing the information to the user with an emphasis are increased as long as the information is important.

Further, in the value reset process of the above described embodiments, it is determined based on the display adjustment result whether the display content corresponding to each voice information item is output from the image output device 30c. However, the feature is not limited to this. The output of each display content to the image output device 30c is monitored, and the above determination may be performed based on a monitoring result. Alternatively, the above determination may be performed based on information specified by the application program. It is not necessary to configure the output control device 1 for executing the output control of the image output device 30c and the display adjustment process. The output control device 1 may be configured as at least a voice output control device.

The output control device 1 according to the above embodiments is configured to receive the information output request from the vehicular ECU 20. The output control device 1 is not limited to this feature. For example, the output control device 1 may be configured such that multiple application programs mounted on the output control device transmit the information output requests, and the output control device receives the requests.

The output control device 1 according to the above embodiments is mounted on the vehicle. The output control device 1 is not limited to this feature. The present invention may be applied to various computers in a feature other than the feature that the output control device is mounted on the vehicle.

The above disclosure has the following aspects.

According to an aspect of the present disclosure, a voice output control device includes a control unit. The control unit controls a voice output device to output a plurality of voice information items according to a plurality of output requests transmitted from a plurality of output request units for requesting an output of a voice information item. When the plurality of output requests are transmitted to the control unit, the control unit compares a high and low relationship of information values preliminary set in the voice information items corresponding to the output requests, and controls the voice output device to output preferentially the voice information item having a higher information value. The control unit includes: a determination unit and a variable value setting unit.

The determination unit determines whether a display device outputs a content corresponding to each voice information item. The output of each content to the display device may be monitored, and the above determination may be performed based on a monitoring result. Alternatively, the determination may be performed based on information relating to the content, which is preliminary set in the voice information item together with the information value. Alternatively, an adjustment of a content display may be performed, and the above determination may be performed based on an adjustment result. The determination unit may determine before displaying the content actually. Alternatively, the determination unit may determine after displaying the content actually.

The variable value setting unit sets an information value of a voice information item corresponding to the content variably according to a determination result of the determination unit. Thus, when the plurality of voice information items are output candidates simultaneously, the information values are set variably in view of a presence or absence of a display of the content corresponding to the voice information.

According to an aspect of the present disclosure, the presence or absence of the content display, which is not considered in a prior art, is considered. Thus, the schedule of the output of the voice information item is adjusted in a flexible manner, compared with a case where the voice output is cancelled with no exception in accordance with the number of inputs. Accordingly, the adjustment of the voice output according to the information value of the voice information item is flexibly performed.

When the display device outputs the content, the variable value setting unit may reduce an information value of a voice information item corresponding to the content. In this case, all of the information outputs are easily performed using one of the voice output and the content display, so that a large amount of information is effectively provided to the user.

When the display device outputs the content, the variable value setting unit may increase an information value of a voice information item corresponding to the content. In this case, the voice output is easily performed as long as the content display of the information is executed. Thus, opportunities for providing the information to the user with an emphasis of the information for the content display are increased using the voice output in addition to the display.

Not limited to the above features, the variable value setting unit may set the information value of the voice information item variably in various manners. For example, when the display device does not output the content, the variable value setting unit may increase and decrease the information value of the voice information item corresponding to the content. For example, when the variable value setting unit increases the information value such that, the information values of other voice information items for performing the content display are reduced relatively. Thus, according to reasons already described, many information items are provided to the user effectively. For example, when the variable value setting unit decreases the information value such that, the information values of other voice information items for performing the content display are increased relatively. Thus, according to reasons already described, opportunities for providing the information to the user with an emphasis are increased as long as the content display of the information is performed.

Further, when the display device outputs the content, the variable value setting unit may set the information value of the voice information item corresponding to the content variably according to the display mode of the content in the display device.

For example, when the display information amount of the content is small, the reduction amount of the voice information value of the voice information item becomes small. When the display information amount of the content is large, the reduction amount of the voice information value of the voice information item becomes large. In this case, the information amount provided to the user becomes constant easily with respect to the plurality of voice information items, which are output candidates simultaneously. Accordingly, many information items are provided to the user appropriately.

For example, when the display information amount of the content is small, the increase amount of the voice information value of the voice information item becomes small. When the display information amount of the content is large, the increase amount of the voice information value of the voice information item becomes large. In this case, when the display information amount of the content is large, the voice output is easily performed. Accordingly, opportunities for providing the information to the user with an much emphasis are increased as long as the information has a large display information amount.

According to another aspect of the present disclosure, a program is distributed to the market place. Specifically, the program functions a computer as the above described control unit.

The program is installed into one or more computers, so that the program provides effects similar to the effects provided by the voice output control device according to the aspect of the present disclosure. Here, The program according to the another aspect of the present disclosure is stored in a ROM, a flash memory, or the like, which is mounted in the computer, and the program may be loaded to the computer from the ROM, the flash memory or the like. Alternatively, the program may be down-loaded to the computer through a network.

The above program may be recorded in various types of storage mediums, which are readable using the computer. The storage medium may be a tangible non-transitory storage medium. The storage medium may be a semiconductor memory (such as a USB memory and a memory card (registered trademark), which is portable.

The invention claimed is:

1. A voice output control device comprising:
    a control unit, having a CPU that executes a program stored in a memory, that controls a voice output device to output a plurality of voice information items according to a plurality of output requests transmitted from a plurality of output request units for requesting an output of a voice information item, compares a high and low relationship of information values preliminary set in the voice information items corresponding to the output requests, and controls the voice output device to adjust a voice output of the voice output device by preferentially outputting the voice information item having a higher information value, wherein:
    the information value defines a priority of outputting the voice information items; and
    the control unit
        determines whether a display device outputs a content corresponding to each voice information item, and whether the voice output device outputs the voice information item,
        sets each information value variably according to a determination result of the control unit, and
        controls the display device to preferentially display the content corresponding to the voice information item having the higher information value, and further controls the voice output device to preferentially output the voice information item having the higher information value, and
        reduces the information value of a voice information item corresponding to the content when the control unit determines that the display device has output the content corresponding to each voice information item; and
        the control unit does not change the information value of the voice information item corresponding to the content when the control unit determines that the display device does not have output the content corresponding to each voice information item;
        and wherein:
        the control unit determines whether a significant information end time of the voice information item occurs later than a delay allowance deadline of a later voice information item and sets each information value variably additionally based on the determination of whether the significant information end time of the voice information item occurs later than the delay allowance deadline of the later voice information item; and
        the significant information end time corresponds to a time at which outputting the content of the voice information item is complete and the delay allowance deadline corresponds to a permissible time of delay from when an output request corresponding to the later voice information item is received until outputting the later voice information item.

2. The voice output control device according to claim 1, wherein:
    when the display device outputs the content, the control unit sets the information value of a voice information item corresponding to the content according to a display mode of the content in the display device.

3. The voice output control device according to claim 1, wherein:
    when the display device outputs the content, and a connection between the content and a voice information item corresponding to the content is strong, the control unit increases the information value of the voice information item corresponding to the content; and
    when the display device outputs the content, and a connection between the content and a voice information item corresponding to the content is weak, the control unit decreases the information value of the voice information item corresponding to the content.

4. The voice output control device according to claim 1, wherein the plurality of output request units include a vehicular electronic control unit configured to provide route guidance.

5. The voice output control device according to claim 1, wherein the plurality of output request units include a vehicular electronic control unit configured to provide fare guidance for an electronic toll collection system.

6. The voice output control device according to claim 1, wherein the plurality of output request units include a vehicular electronic control unit configured to provide driving support guidance.

7. A voice output control device comprising:
    a control unit, having a CPU that executes a program stored in a memory, that controls a voice output device to output a plurality of voice information items according to a plurality of output requests transmitted from a plurality of output request units for requesting an output of a voice information item, compares a high and low relationship of information values preliminary set in the voice information items corresponding to the output requests, and controls the voice output device to adjust a voice output of the voice output device by preferentially outputting the voice information item having a higher information value, wherein:
    the information value defines a priority of outputting the voice information items; and
    the control unit
        determines whether a display device outputs a content corresponding to each voice information item, and whether the voice output device outputs the voice information item,
        sets each information value variably according to a determination result of the control unit,
        controls the display device to preferentially display the content corresponding to the voice information item having the higher information value, and further controls the voice output device to preferentially output the voice information item having the higher information value, increases the information value of a voice information item corresponding to the content when the control unit determines that the display device has output the content corresponding to each voice information item; and the control unit does not change the information value of the voice information item corresponding to the content when the control unit determines that the display device does not have output the content corresponding to each voice information item;

and wherein:

the control unit determines whether a significant information end time of the voice information item occurs later than a delay allowance deadline of a later voice information item and sets each information value variably additionally based on the determination of whether the significant information end time of the voice information item occurs later than the delay allowance deadline of the later voice information item; and the significant information end time corresponds to a time at which outputting the content of the voice information item is complete and the delay allowance deadline corresponds to a permissible time of delay from when an output request corresponding to the later voice information item is received until outputting the later voice information item.

8. A voice output control method comprising:

controlling a voice output device to output a plurality of voice information items according to a plurality of output requests transmitted from a plurality of output request units for requesting an output of a voice information item, wherein:

the controlling of the voice output device includes:

comparing a high and low relationship of information values preliminary set in the voice information items corresponding to the output requests;

controlling the voice output device to adjust a voice output of the voice output device by preferentially outputting the voice information item having a higher information value;

determining whether a display device outputs a content corresponding to each voice information item, and whether the voice output device outputs the voice information item;

setting each information value variably according to a determination result of the determining;

controlling the display device to preferentially display the content corresponding to the voice information item having the higher information value, and further controlling the voice output device to preferentially output the voice information item having the higher information value;

determining whether a significant information end time of the voice information item occurs later than a delay allowance deadline of a later voice information item and sets each information value variably additionally based on the determination of whether the significant information end time of the voice information item occurs later than the delay allowance deadline of the later voice information item, and the information value defines a priority of outputting the voice information items, wherein, when determining that the display device has output the content corresponding to each voice information item, the setting of each information value variably includes reducing the information value of a voice information item corresponding to the content, wherein, when determining that the display device does not have output the content corresponding to each voice information item, the setting of each information value of the voice information item corresponding to the content, and wherein the significant information end time corresponds to a time at which outputting the content of the voice information item is complete and the delay allowance deadline corresponds to a permissible time of delay from when an output request corresponding to the later voice information item is received until outputting the later voice information item.

9. The voice output control method according to claim 8, wherein the controlling of the voice output device includes determining whether a significant information end time of the voice information item occurs later than a delay allowance deadline of a later voice information item and sets each information value variably additionally based on the determination of whether the significant information end time of the voice information item occurs later than the delay allowance deadline of the later voice information item; and the significant information end time corresponds to a time at which outputting the content of the voice information item is complete and the delay allowance deadline corresponds to a permissible time of delay from when an output request corresponding to the later voice information item is received until outputting the later voice information item.

10. A non-transitory computer readable storage medium storing a program for functioning a computer as:

a control unit that controls a voice output device to output a plurality of voice information items according to a plurality of output requests transmitted from a plurality of output request units for requesting an output of a voice information item, compares a high and low relationship of information values preliminary set in the voice information items corresponding to the output requests, and controls the voice output device to adjust a voice output of the voice output device by preferentially outputting the voice information item having a higher information value;

a determination unit that determines whether a display device outputs a content corresponding to each voice information item, and whether the voice output device outputs the voice information item; and a variable value setting unit that sets each information value variably according to a determination result of the determination unit, wherein:

the control unit controls the display device to preferentially display the content corresponding to the voice information item having the higher information value, and further controls the voice output device to preferentially output the voice information item having the higher information value;

the information value defines a priority of outputting the voice information items;

when the determination unit determines that the display device has output the content, the control unit reduces the information value of a voice information item corresponding to the content;

when the determination unit determines that the display device does not have output the content, the control unit does not change the information value of the voice information item corresponding to the content;

the control unit determines whether a significant information end time of the voice information item occurs later than a delay allowance deadline of a later voice information item and sets each information value variably additionally based on the determination of whether the significant information end time of the voice information item occurs later than the delay allowance deadline of the later voice information item; and the significant information end time corresponds to a time at which outputting the content of the voice information item is complete and the delay allowance deadline corresponds to a permissible time of delay from when an output request corresponding to the later voice information item is received until outputting the later voice information item.

11. The non-transitory computer readable storage medium according to claim 10, wherein:

the determination unit further determines whether a significant information end time of the voice information item occurs later than a delay allowance deadline of a later voice information item;

the variable value setting unit sets each information value variably additionally based on the determination of whether the significant information end time of the voice information item occurs later than the delay allowance deadline of the later voice information item; and the significant information end time corresponds to a time at which outputting the content of the voice information item is complete and the delay allowance deadline corresponds to a permissible time of delay from when an output request corresponding to the later voice information item is received until outputting the later voice information item.

12. A voice output control method comprising:

controlling a voice output device to output a plurality of voice information items according to a plurality of output requests transmitted from a plurality of output request units for requesting an output of a voice information item, wherein:

the controlling of the voice output device includes:

comparing a high and low relationship of information values preliminary set in the voice information items corresponding to the output requests;

controlling the voice output device to output preferentially the voice information item having a higher information value;

determining whether a display device outputs a content corresponding to each voice information item; and setting each information value variably according to a determination result of the determining, determining whether a significant information end time of the voice information item occurs later than a delay allowance deadline of a later voice information item and sets each information value variably additionally based on the determination of whether the significant information end time of the voice information item occurs later than the delay allowance deadline of the later voice information item;

wherein:

when determining that the display device has output the content, the setting of each information value variably includes increasing the information value of a voice information item corresponding to the content;

when determining that the display device does not have output the content, the setting of each information value variably includes: not changing the information value of the voice information item corresponding to the content; and and the significant information end time corresponds to a time at which outputting the content of the voice information item is complete and the delay allowance deadline corresponds to a permissible time of delay from when an output request corresponding to the later voice information item is received until outputting the later voice information item.

13. A non-transitory computer readable storage medium storing a program for functioning a computer as:

a control unit that controls a voice output device to output a plurality of voice information items according to a plurality of output requests transmitted from a plurality of output request units for requesting an output of a voice information item, compares a high and low relationship of information values preliminary set in the voice information items corresponding to the output requests, and controls the voice output device to output preferentially the voice information item having a higher information value;

a determination unit that determines whether a display device outputs a content corresponding to each voice information item; and a variable value setting unit that sets each information value variably according to a determination result of the determination unit, wherein:

when the determination unit determines that the display device has output the content, the variable value setting unit increases the information value of a voice information item corresponding to the content; and when the determination unit determines that the display device does not have output the content, the control unit does not change the information value of the voice information item corresponding to the content;

and wherein:

the control unit determines whether a significant information end time of the voice information item occurs later than a delay allowance deadline of a later voice information item and sets each information value variably additionally based on the determination of whether the significant information end time of the voice information item occurs later than the delay allowance deadline of the later voice information item; and the significant information end time corresponds to a time at which outputting the content of the voice information item is complete and the delay allowance deadline corresponds to a permissible time of delay from when an output request corresponding to the later voice information item is received until outputting the later voice information item.

* * * * *